US012723728B2

(12) United States Patent
Park et al.

(10) Patent No.: US 12,723,728 B2
(45) Date of Patent: Sep. 1, 2026

(54) LAMP FOR VEHICLE

(71) Applicant: HYUNDAI MOBIS CO., LTD., Seoul (KR)

(72) Inventors: Tae Yang Park, Yongin-si (KR); Na Ram Jun, Yongin-si (KR); Hyun Soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/289,405

(22) Filed: Aug. 4, 2025

(65) Prior Publication Data

US 2026/0168642 A1 Jun. 18, 2026

(30) Foreign Application Priority Data

Dec. 12, 2024 (KR) ........................ 10-2024-0184910

(51) Int. Cl.
*F21S 43/239* (2018.01)
*F21S 43/247* (2018.01)

(52) U.S. Cl.
CPC ........... *F21S 43/239* (2018.01); *F21S 43/247* (2018.01)

(58) Field of Classification Search
CPC ...... F21S 43/245; F21S 43/243; F21S 43/242; F21S 43/247; F21S 43/239; F21S 41/43
See application file for complete search history.

(56) References Cited

U.S. PATENT DOCUMENTS

2012/0314448 A1* 12/2012 Nakada ................ F21S 43/245
362/602

FOREIGN PATENT DOCUMENTS

JP 2010199053 A * 9/2010 ............ F21S 43/315
WO WO-2025154493 A1 * 7/2025 .............. F21S 41/27

* cited by examiner

*Primary Examiner* — Anabel Ton
(74) *Attorney, Agent, or Firm* — NSIP Law

(57) ABSTRACT

A lamp for a vehicle includes a light source, and a light guide part to receive light emitted from the light source, in which a lower surface portion of the light guide part includes a lower total reflection region in which the light emitted from the light source is totally reflected, and a refraction region spaced apart forward from the lower total reflection region such that the light emitted from the light source is refracted while passing through the refraction region, and in which an upper surface portion of the light guide part includes an upper total reflection region spaced apart forward from the lower total reflection region, spaced apart rearward from the refraction region, such that the light, which is emitted from the light source and totally reflected in the lower total reflection region, is totally reflected.

17 Claims, 4 Drawing Sheets

LAMP FOR VEHICLE

CROSS-REFERENCE TO RELATED APPLICATION

This application claims priority to and the benefit of Korean Patent Application No. 10-2024-0184910 filed in the Korean Intellectual Property Office on Dec. 12, 2024, the entire contents of which are incorporated herein by reference.

TECHNICAL FIELD

The present disclosure relates to a lamp for a vehicle.

BACKGROUND

Various types of vehicle lamps, which are classified depending on functions thereof, are mounted in a vehicle. For example, low beam lamps, high beam lamps, daytime running light (DRL) lamps, and the like are mounted on a front side of the vehicle. The low beam lamp forms a low beam distribution pattern, the high beam lamp forms a high beam distribution pattern, and the DRL lamp forms a DRL distribution pattern.

Meanwhile, regulations require vehicles to form signal light distribution patterns in addition to the types of light distribution patterns described above. The signal light distribution pattern refers to a light distribution pattern formed above the low beam distribution pattern. The signal light distribution pattern refers to a light distribution pattern having minimum brightness capable of identifying objects, such as signs, present in an upper region in front of the vehicle.

SUMMARY

The present disclosure has been made in an effort to provide a lamp for a vehicle, the lamp being capable of forming a signal light distribution pattern without adding a separate optical system for forming a signal light distribution pattern.

In order to achieve the above-mentioned object, one aspect of the present disclosure provides a lamp for a vehicle, the lamp including: a light source; and a light guide part disposed at one side of the light source and configured to receive light emitted from the light source, in which the light guide part includes: a front surface portion configured to define a front region of the light guide part; a rear surface portion configured to define a rear region of the light guide part; an upper surface portion configured to connect the front surface portion to the rear surface portion and configured to define an upper region of the light guide part; and a lower surface portion configured to connect the front surface portion to the rear surface portion and configured to define a lower region of the light guide part, in which the lower surface portion includes: a lower total reflection region in which the light emitted from the light source is totally reflected; and a refraction region spaced apart forward from the lower total reflection region and configured such that the light emitted from the light source is refracted while passing through the refraction region, and in which the upper surface portion includes an upper total reflection region spaced apart forward from the lower total reflection region, spaced apart rearward from the refraction region, and configured such that the light, which is emitted from the light source and totally reflected in the lower total reflection region, is totally reflected.

The light guide part may be formed integrally.

The lower total reflection region may include: a first lower total reflection surface having an inclined surface shape lowered forward; and a second lower total reflection surface connected to a front end of the first lower total reflection surface and having an inclined surface shape raised forward.

The upper total reflection region may have a shape recessed downward.

The upper total reflection region may include an upper total reflection surface having an inclined surface shape raised forward and configured such that the light totally reflected in the lower total reflection region reaches the upper total reflection surface.

The upper total reflection region may include an upper connection surface connected to a rear end of the upper total reflection surface and spaced apart rearward from the light totally reflected in the lower total reflection region.

An angle between the upper total reflection surface and an upward/downward direction H may be larger than an angle between the upper connection surface and the upward/downward direction H.

The refraction region may have a shape recessed upward.

The refraction region may include: a first refraction surface having an inclined surface shape raised forward; and a second refraction surface connected to a front end of the first refraction surface and having an inclined surface shape lowered forward.

An angle between the first refraction surface and an upward/downward direction H may be smaller than an angle between the second refraction surface and the upward/downward direction H.

The lower surface portion may include: a lower surface rear portion including the lower total reflection region; a lower surface front portion spaced apart forward from the lower surface rear portion, having a shape protruding further downward than the lower surface rear portion, and including the refraction region; and a lower surface connection portion configured to connect the lower surface rear portion to the lower surface front portion and having a shape recessed upward.

The lower surface connection portion may include a stepped section disposed at a boundary between a first side surface based on a leftward/rightward direction W and a second side surface based on the leftward/rightward direction W.

The light guide part may include a light collection region disposed between the upper surface portion and the lower surface portion and disposed to face the light source, and the first lower total reflection surface may be disposed in the light collection region.

The lamp may include: a reflection part disposed below the light guide part and having an upper surface on which a light reflection surface is disposed.

A portion of the light reflection surface, which receives light that is emitted from the light source and sequentially passes through the lower total reflection region, the upper total reflection region, and the refraction region, may be disposed rearward of the front surface portion.

A rear surface of the lower surface front portion may have a shape convex rearward.

At least a part of the rear surface of the lower surface front portion may be positioned on a straight line that connects the upper total reflection region and the refraction region.

The upper total reflection region and the refraction region may be respectively spaced apart inward from two opposite surfaces of the light guide part based on a leftward/rightward direction W.

According to the present disclosure, it is possible to provide the lamp for a vehicle, the lamp being capable of forming the signal light distribution pattern without adding a separate optical system for forming the signal light distribution pattern.

DETAILED DESCRIPTION

Hereinafter, a lamp for a vehicle according to the present disclosure will be described with reference to the drawings.

Lamp for Vehicle

Figure 1:
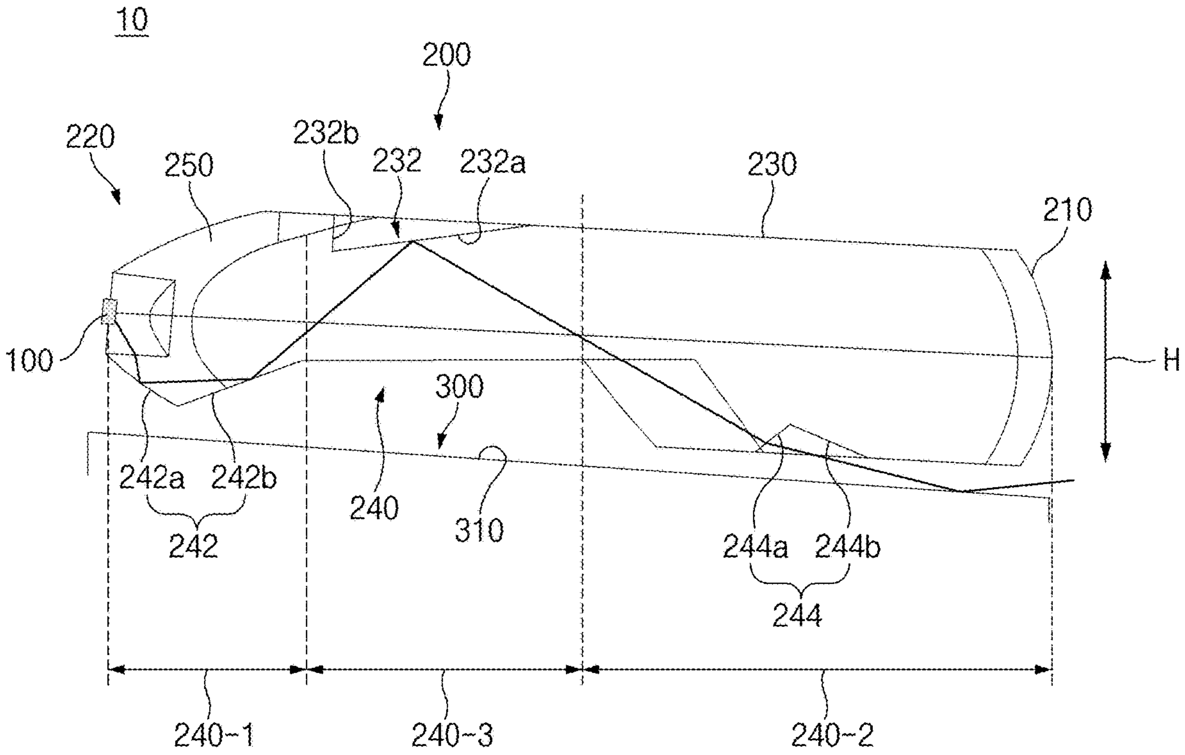
FIG. 1 is a side view of a lamp for a vehicle according to the present disclosure.
Figure 2:
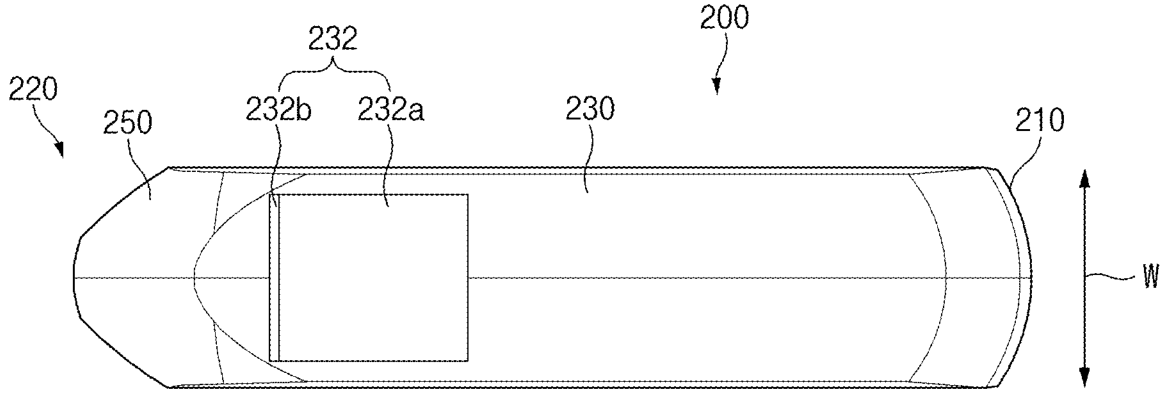
FIG. 2 is a top plan view of a light guide part provided in the lamp for a vehicle according to the present disclosure.
Figure 3:
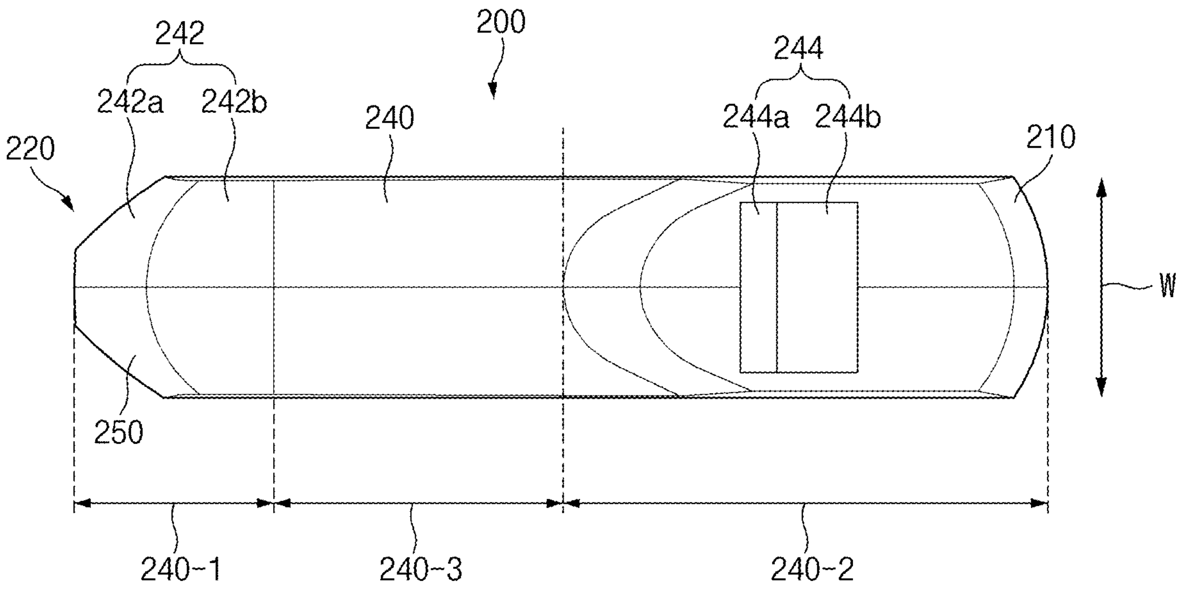
FIG. 3 is a bottom plan view of the light guide part provided in the lamp for a vehicle according to the present disclosure.
Figure 4:
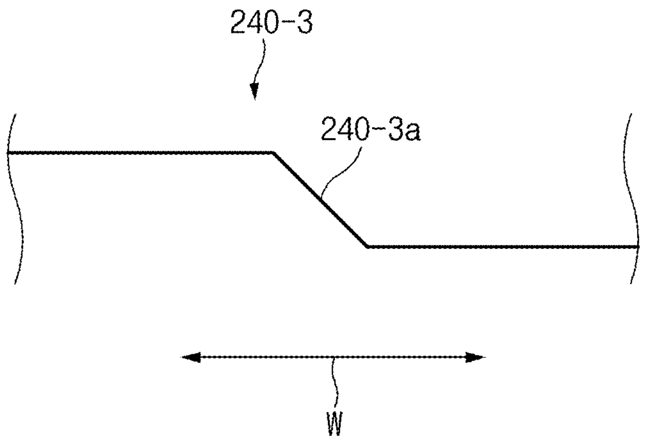
FIG. 4 is a view illustrating a cross-sectional structure of a lower surface connection portion of the light guide part provided in the lamp for a vehicle according to the present disclosure.

FIG. 1 is a side view of a lamp for a vehicle according to the present disclosure, and FIG. 2 is a top plan view of a light guide part provided in the lamp for a vehicle according to the present disclosure. FIG. 3 is a bottom plan view of the light guide part provided in the lamp for a vehicle according to the present disclosure, and FIG. 4 is a view illustrating a cross-sectional structure of a lower surface connection portion of the light guide part provided in the lamp for a vehicle according to the present disclosure.

With reference to FIGS. 1 to 4, a lamp 10 for a vehicle (hereinafter, referred to as a 'lamp') according to the present disclosure may include a light source 100, and a light guide part 200 provided at one side of the light source 100 and configured to receive light emitted from the light source 100. More specifically, the light guide part 200 may include a front surface portion 210 configured to define a front region of the light guide part 200, a rear surface portion 220 configured to define a rear region of the light guide part 200, an upper surface portion 230 configured to connect the front surface portion 210 and the rear surface portion 220 and configured to define an upper region of the light guide part 200, and a lower surface portion 240 configured to connect the front surface portion 210 and the rear surface portion 220 and configured to define a lower region of the light guide part 200.

Meanwhile, according to the present disclosure, the entire light guide part 200 may be formed integrally. More specifically, the entire portion of the light guide part 200 to be described below may be manufactured as an integrated lens.

The lamp 10 according to the present disclosure may form a low beam distribution pattern or a high beam distribution pattern and additionally form a signal light distribution pattern. The features of the light guide part 200 for forming the signal light distribution pattern will be described in detail.

With reference to FIGS. 1 to 3, the lower surface portion 240 may include a lower total reflection region 242 in which light emitted from the light source 100 is totally reflected, and a refraction region 244 provided to be spaced apart forward from the lower total reflection region 242 and configured such that the light emitted from the light source 100 is refracted while passing through the refraction region 244. In addition, the upper surface portion 230 may include an upper total reflection region 232 provided to be spaced apart forward from the lower total reflection region 242, provided to be spaced apart rearward from the refraction region 244, and configured such that the light, which is emitted from the light source 100 and totally reflected in the lower total reflection region 242, is totally reflected.

A process in which the light emitted from the light source 100 of the lamp 10 according to the present disclosure passes through the light guide part 200 and exits while forming the signal light distribution pattern will be described below. First, a part of the light emitted from the light source 100 moves forward and upward while being totally reflected in the lower total reflection region 242. Thereafter, when the light reaches the upper total reflection region 232, the light is totally reflected again and then moves forward and downward. Thereafter, the light is refracted while passing through the refraction region 244 and then exits to the outside of the light guide part 200. Thereafter, the light exiting from the light guide part 200 is reflected by a reflection part to be described below and then exits forward and upward, such that the signal light distribution pattern is formed.

Meanwhile, as illustrated in FIGS. 1 and 3, the lower total reflection region 242 may include a plurality of surfaces. More specifically, the lower total reflection region 242 may include a first lower total reflection surface 242*a* having an inclined surface shape lowered forward, and a second lower total reflection surface 242*b* connected to a front end of the first lower total reflection surface 242*a* and having an inclined surface shape raised forward. It may be understood that the lower total reflection region 242 has a cross-sectional structure having an approximately 'V' shape. According to the present disclosure, the light, which is emitted from the light source 100 and reaches the lower total reflection region 242, may be primarily totally reflected by the first lower total reflection surface 242*a*, secondarily totally reflected by the second lower total reflection surface 242*b*, and then moved toward the upper total reflection region 232.

Meanwhile, according to the present disclosure, the upper total reflection region 232 may have a shape recessed downward. In this case, similar to the lower total reflection region 242, the upper total reflection region 232 may also include a plurality of surfaces. More specifically, as illustrated in FIGS. 1 and 2, the upper total reflection region 232 may include an upper total reflection surface 232*a* having an inclined surface shape raised forward and configured such that the light totally reflected in the lower total reflection region 242 reaches the upper total reflection surface 232*a*. Therefore, the light, which reaches the upper total reflection region 232 from the lower total reflection region 242, may be totally reflected again by the upper total reflection surface 232*a* and then move toward the refraction region 244.

Meanwhile, the upper total reflection region 232 may further include an upper connection surface 232*b* connected to a rear end of the upper total reflection surface 232*a* and extending upward from the upper total reflection surface 232*a*. In this case, the upper connection surface 232*b* may be provided to be spaced apart rearward from the light totally reflected in the lower total reflection region 242. That is, according to the present disclosure, the upper connection surface 232*b* may be physically spaced apart from an optical path of the light that contributes to forming the signal light distribution pattern formed by the lamp according to the present disclosure. For example, the drawings illustrate that an angle defined between the upper total reflection surface 232*a* and an upward/downward direction H is larger than an angle defined between the upper connection surface 232*b* and the upward/downward direction H.

Meanwhile, the refraction region 244 may have a shape recessed upward. In this case, similar to the lower total reflection region 242 and the upper total reflection region 232, the refraction region 244 may also include a plurality of surfaces. More specifically, as illustrated in FIGS. 1 and 3, the refraction region 244 may include a first refraction surface 244*a* having an inclined surface shape raised forward, and a second refraction surface 244*b* connected to a front end of the first refraction surface 244*a* and having an inclined surface shape lowered forward. It may be understood that the refraction region 244 has an approximately inverted 'V' shape in the upward/downward direction H. According to the present disclosure, the light, which is totally reflected in the upper total reflection region 232 and then reaches the refraction region 244*a*, may be refracted to be curved forward while passing through the first refraction surface 244*a* and then exit to the outside of the light guide part 200. For example, FIGS. 1 and 3 illustrate that an angle defined between the first refraction surface 244*a* and the upward/downward direction H is smaller than an angle defined between the second refraction surface 244*b* and the upward/downward direction H.

Meanwhile, according to the present disclosure, the lower surface portion 240 may be divided into a plurality of portions. However, it is noted that because the entire portion of the light guide part 200 is integrated as described above, the plurality of portions are merely distinguished conceptually and are not considered physically separate components.

Meanwhile, the lower surface portion 240 may include a lower surface rear portion 240-1 having the above-mentioned lower total reflection region 242, a lower surface front portion 240-2 provided to be spaced apart forward from the lower surface rear portion 240-1, having a shape further protruding downward than the lower surface rear portion 240-1, and having the above-mentioned refraction region 244, and a lower surface connection portion 240-3 configured to connect the lower surface rear portion 240-1 and the lower surface front portion 240-2 and having a shape recessed upward entirely. More specifically, the lower surface connection portion 240-3 may have a shape further recessed upward in comparison with the lower surface rear portion 240-1 and the lower surface front portion 240-2.

As described above, the lamp 10 according to the present disclosure may also form a low beam distribution pattern separately from the signal light distribution pattern. In this case, as illustrated in FIGS. 1, 3, and 4, the lower surface connection portion 240-3 may further include a stepped section 240-3*a* formed at a boundary between one side surface based on a leftward/rightward direction W and the other side surface based on the leftward/rightward direction W. The stepped section 240-3*a* may have a shape corresponding to a cut-off line defined at an upper boundary of the low beam distribution pattern.

Meanwhile, the light guide part 200 may further include a light collection region 250 formed between the upper surface portion 230 and the lower surface portion 240 and provided to face the light source 100. As can be seen from the designation, the light collection region 250 may serve to collect the light emitted from the light source 100, thereby improving overall luminous efficiency of the lamp. At least a part of the light collection region 250 may have a collimator shape. Meanwhile, in an exemplary example, the first lower total reflection surface 242*a* may be formed in the light collection region 250. That is, the first lower total reflection surface 242*a* may be formed on a lower surface of the light collection region 250.

Meanwhile, as illustrated in FIG. 1, the lamp 10 according to the present disclosure may further include a reflection part 300 provided below the light guide part 200 and having an upper surface on which a light reflection surface 310 is formed. According to the present disclosure, the light, which is refracted in the refraction region 244 and then exits to the outside from the light guide part 200, may reach the light reflection surface 310 of the reflection part 300, be reflected by the light reflection surface 310 of the reflection part 300, and then move forward and upward, such that the signal light distribution pattern may be finally formed. More particularly, a portion of the light reflection surface 310, which receives the light that has been emitted from the light source 100 and sequentially passed through the lower total reflection region 242, the upper total reflection region 232, and the refraction region 244, may be formed rearward of the front surface portion 210.

Meanwhile, in an example of the present disclosure, a rear surface of the lower surface front portion 240-2 may have a shape convex rearward. In this case, at least a part of the rear surface of the lower surface front portion 240-2 may be positioned on a straight line that connects the upper total reflection region 232 and the refraction region 244. Therefore, in consideration of the straightness of light, the light exiting from the upper total reflection region 232 may reach the rear surface of the lower surface front portion 240-2 before reaching the refraction region 244, and the light, which reaches the rear surface of the lower surface front portion 240-2, may be collected in a horizontal direction and then reach the refraction region 244.

Meanwhile, with reference to FIGS. 2 and 3, the upper total reflection region 232 and the refraction region 244 may be respectively spaced apart inward from two opposite surfaces of the light guide part 200 based on the leftward/rightward direction W. It may be understood that a width of the upper total reflection region 232 and a width of the refraction region 244 in the leftward/rightward direction W are each smaller than a width of the light guide part 200 in the leftward/rightward direction W.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A lamp for a vehicle, the lamp comprising:

a light source; and a light guide part disposed at one side of the light source and configured to receive light emitted from the light source, wherein the light guide part comprises:

a front surface portion configured to define a front region of the light guide part;

a rear surface portion configured to define a rear region of the light guide part;

an upper surface portion configured to connect the front surface portion to the rear surface portion and configured to define an upper region of the light guide part; and a lower surface portion configured to connect the front surface portion to the rear surface portion and configured to define a lower region of the light guide part, wherein the lower surface portion comprises:

a lower total reflection region in which the light emitted from the light source is totally reflected; and a refraction region spaced apart forward from the lower total reflection region and configured such that the light emitted from the light source is refracted while passing through the refraction region, wherein the upper surface portion comprises an upper total reflection region spaced apart forward from the lower total reflection region, spaced apart rearward from the refraction region, and configured such that the light, which is emitted from the light source and totally reflected in the lower total reflection region, is totally reflected, and wherein the lower total reflection region comprises:

a first lower total reflection surface having an inclined surface shape lowered forward; and a second lower total reflection surface connected to a front end of the first lower total reflection surface and having an inclined surface shape raised forward.

2. The lamp of claim 1, wherein the light guide part is formed integrally.

3. A lamp for a vehicle, the lamp comprising:

a light source; and a light guide part disposed at one side of the light source and configured to receive light emitted from the light source, wherein the light guide part comprises:

a front surface portion configured to define a front region of the light guide part;

a rear surface portion configured to define a rear region of the light guide part;

an upper surface portion configured to connect the front surface portion to the rear surface portion and configured to define an upper region of the light guide part; and a lower surface portion configured to connect the front surface portion to the rear surface portion and configured to define a lower region of the light guide part, wherein the lower surface portion comprises:

a lower total reflection region in which the light emitted from the light source is totally reflected; and a refraction region spaced apart forward from the lower total reflection region and configured such that the light emitted from the light source is refracted while passing through the refraction region, wherein the upper surface portion comprises an upper total reflection region spaced apart forward from the lower total reflection region, spaced apart rearward from the refraction region, and configured such that the light, which is emitted from the light source and totally reflected in the lower total reflection region, is totally reflected, and wherein the upper total reflection region has a shape recessed downward.

4. The lamp of claim 3, wherein the upper total reflection region comprises an upper total reflection surface having an inclined surface shape raised forward and configured such that the light totally reflected in the lower total reflection region reaches the upper total reflection surface.

5. The lamp of claim 4, wherein the upper total reflection region comprises an upper connection surface connected to a rear end of the upper total reflection surface and spaced apart rearward from the light totally reflected in the lower total reflection region.

6. The lamp of claim 5, wherein an angle between the upper total reflection surface and an upward/downward direction is larger than an angle between the upper connection surface and the upward/downward direction.

7. A lamp for a vehicle, the lamp comprising:

a light source; and a light guide part disposed at one side of the light source and configured to receive light emitted from the light source, wherein the light guide part comprises:

a front surface portion configured to define a front region of the light guide part;

a rear surface portion configured to define a rear region of the light guide part;

an upper surface portion configured to connect the front surface portion to the rear surface portion and configured to define an upper region of the light guide part; and a lower surface portion configured to connect the front surface portion to the rear surface portion and configured to define a lower region of the light guide part, wherein the lower surface portion comprises:

a lower total reflection region in which the light emitted from the light source is totally reflected; and a refraction region spaced apart forward from the lower total reflection region and configured such that the light emitted from the light source is refracted while passing through the refraction region, wherein the upper surface portion comprises an upper total reflection region spaced apart forward from the lower total reflection region, spaced apart rearward from the refraction region, and configured such that the light, which is emitted from the light source and totally reflected in the lower total reflection region, is totally reflected, and wherein the refraction region has a shape recessed upward.

8. The lamp of claim 1, wherein the refraction region comprises:

a first refraction surface having an inclined surface shape raised forward; and a second refraction surface connected to a front end of the first refraction surface and having an inclined surface shape lowered forward.

9. The lamp of claim 8, wherein an angle between the first refraction surface and an upward/downward direction is smaller than an angle between the second refraction surface and the upward/downward direction.

10. The lamp of claim 1, wherein the lower surface portion comprises:

a lower surface rear portion including the lower total reflection region;

a lower surface front portion spaced apart forward from the lower surface rear portion, having a shape protruding further downward than the lower surface rear portion, and including the refraction region; and a lower surface connection portion configured to connect the lower surface rear portion to the lower surface front portion and having a shape recessed upward.

11. The lamp of claim 10, wherein the lower surface connection portion comprises a stepped section disposed at a boundary between a first side surface based on a leftward/rightward direction and a second side surface based on the leftward/rightward direction.

12. The lamp of claim 1, wherein the light guide part comprises a light collection region disposed between the upper surface portion and the lower surface portion and disposed to face the light source, and the first lower total reflection surface is disposed in the light collection region.

13. The lamp of claim 1, further comprising:

a reflection part disposed below the light guide part and having an upper surface on which a light reflection surface is disposed.

14. The lamp of claim 13, wherein a portion of the light reflection surface, which receives light that is emitted from the light source and sequentially passes through the lower total reflection region, the upper total reflection region, and the refraction region, is disposed rearward of the front surface portion.

15. The lamp of claim 10, wherein a rear surface of the lower surface front portion has a shape convex rearward.

16. The lamp of claim 15, wherein at least a part of the rear surface of the lower surface front portion is positioned on a straight line that connects the upper total reflection region to the refraction region.

17. The lamp of claim 1, wherein the upper total reflection region and the refraction region are respectively spaced apart inward from two opposite surfaces of the light guide part based on a leftward/rightward direction.

* * * * *